(12) United States Patent
Shin et al.

(10) Patent No.: US 6,804,444 B2
(45) Date of Patent: Oct. 12, 2004

(54) OPTICAL WAVEGUIDE PLATFORM AND MANUFACTURING METHOD THEREOF

(75) Inventors: Jang-uk Shin, Daejeon (KR); Duk-jun Kim, Daejeon (KR); Sang-ho Park, Daejeon (KR); Young-tak Han, Daejeon (KR); Hee-keyng Sung, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 143 days.

(21) Appl. No.: 10/292,852

(22) Filed: Nov. 12, 2002

(65) Prior Publication Data

US 2003/0190108 A1 Oct. 9, 2003

(30) Foreign Application Priority Data

Mar. 30, 2002 (KR) ........................................ 2002-17599

(51) Int. Cl.[7] ................................................ G02B 6/42
(52) U.S. Cl. .......................................... 385/131; 385/88
(58) Field of Search ................................ 385/129–132, 385/88, 91, 49–50

(56) References Cited

U.S. PATENT DOCUMENTS

| | | | | |
|---|---|---|---|---|
| 5,907,646 A | * | 5/1999 | Kitamura | ...................... 385/14 |
| 6,158,901 A | * | 12/2000 | Kovacic | ...................... 385/88 |
| 6,164,836 A | | 12/2000 | Yamada et al. | |
| 6,356,692 B1 | * | 3/2002 | Ido et al. | ...................... 385/129 |
| 6,430,327 B1 | * | 8/2002 | Kaneyama et al. | ........... 385/14 |

FOREIGN PATENT DOCUMENTS

JP          10-0296382          7/2001

OTHER PUBLICATIONS

Journal of Ligthwave Technology, vol. 14, No. 11, Nov. 1996, "10 Gb/s Hybrid–Integrated Receiver Array Module Using a Planar Lightwave Circuit (PLC) Platform including a Novel Assembly Region Structure", S. Mino, et al., 8 pages.

Journal of Lightwave Technology, vol. 16, No. 7, Jul. 1998, "Multichip Optical Hybrid Integration Technique with Planar Lightwave Circuit Platform", T. Hashimoto, et al., 10 pages.

IEEE Journal of Selected Topics in Quantum Electronics. vol. 6, No. 1, Jan/Feb 2000, "PLC Hybrid Integration Technology ans its Application to Photonic Components", K., Kato, et al., 10 pages.

* cited by examiner

*Primary Examiner*—Akm Enayet Ullah
*Assistant Examiner*—Jerry T Rahll
(74) *Attorney, Agent, or Firm*—Blakely Sokoloff Taylor & Zafman

(57) ABSTRACT

An optical waveguide platform and a manufacturing method thereof are provided. In the provided optical waveguide platform, a terrace on which an optical device is mounted is formed by using an etch stopper pattern formed on a lower clad layer. Therefore, the optical device is mounted without processing a silicon substrate. In addition, in the provided optical waveguide platform, the etch stopper pattern is formed on the lower clad layer to prevent defocus in a photolithography process due to an etch step, so as not to damage a fine waveguide pattern. Moreover, an optical waveguide is formed on the terrace in manufacturing the optical waveguide platform to examine the characteristics of the optical waveguide device before etching a trench.

9 Claims, 7 Drawing Sheets

OPTICAL WAVEGUIDE PLATFORM AND MANUFACTURING METHOD THEREOF

BACKGROUND OF THE INVENTION

This application claims the priority of Korean Patent Application No. 2002-17599, filed Mar. 30, 2002 in the Korean Intellectual Property Office, which is incorporated herein in its entirety by reference.

1. Field of the Invention

The present invention relates to a planar optical waveguide-type optical transceiver module and a manufacturing method thereof, and more particularly, to an optical waveguide platform for mounting an optical device by a flip chip bonding method and a manufacturing method thereof.

2. Description of the Related Art

An optical device of a planar optical waveguide manufactured on a substrate, for example, a silicon substrate, by a flame hydrolysis deposition (FHD) method or a plasma enhanced chemical vapor deposition (PECVD) method, functions as a passive optical device. However, the optical device cannot function as a light emitting device, such as a laser diode (LD), a light receiving device, such as a photo diode (PD), nor any other active optical device that has electro-optical functions or active optical functions. Accordingly, in order to perform optical switching, optical exchanging, optical signal transmitting, and optical signal receiving functions, a separate active device chip has to be hybrid mounted with an optical waveguide device, so as to perform both the passive optical function of an optical waveguide and the active optical function of a semiconductor active device. In this case, it is necessary to make a small-sized active optical device in the form of a chip, using a semiconductor technique, and to precisely align and mount the active optical device on an optical waveguide device, so as to reduce optical contact loss. Accordingly, an optical waveguide platform for mounting an active optical device by a proper method, such as a flip chip bonding method, is required.

Figure 1A:
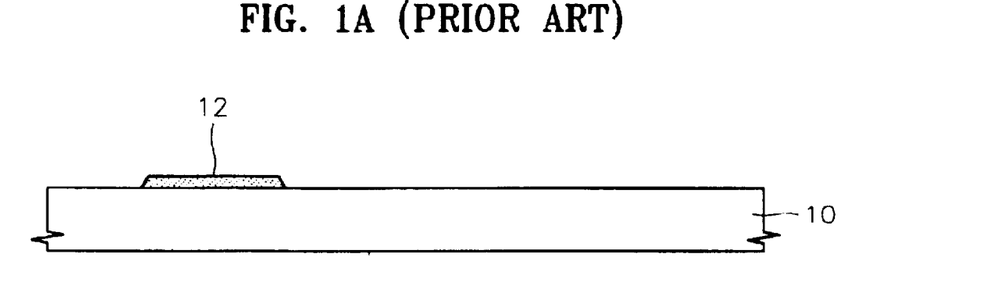
FIGS. 1A through 1G are sectional views illustrating a first conventional method of manufacturing an optical waveguide platform.
Figure 1B:
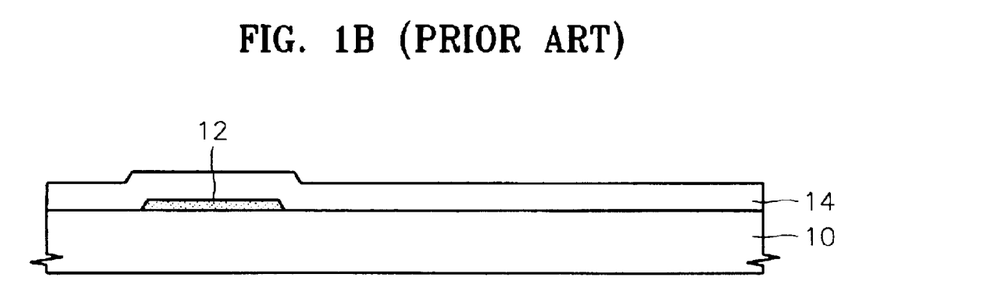

FIGS. 1A through 1G are sectional views illustrating a conventional method of manufacturing an optical waveguide platform. A terrace 12 is formed on a silicon substrate 10 by an anisotropic etching method, as shown in FIG. 1A. Thereafter, a lower clad layer 14 formed of a silica layer is formed on the silicon substrate 10 having the terrace 12. Here, a step is formed on the surface of the lower clad layer 14 by the step of the terrace 12, as shown in FIG. 1B.

Figure 1C:
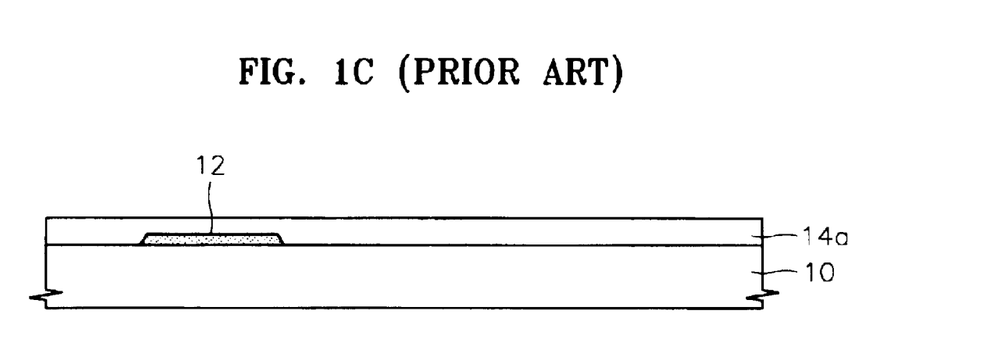
Figure 1D:
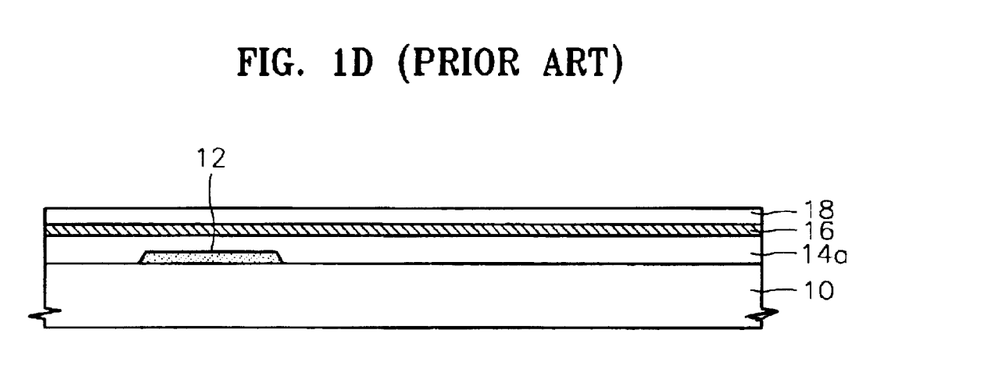
Figure 1E:
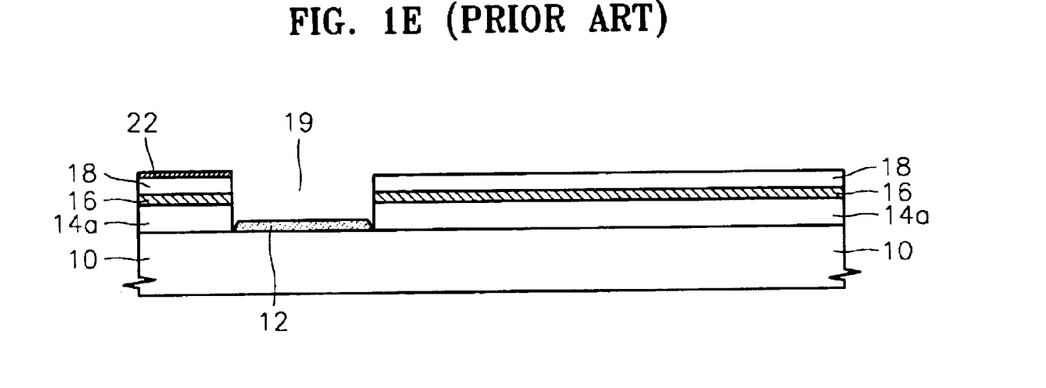

In order to remove the step on the surface of the lower clad layer 14, which is formed by the step of the terrace 12, the lower clad layer 14 is polished. Thus, a planarized lower clad layer 14a is formed, as shown in FIG. 1C. Next, a core layer 16 is formed on the planarized lower clad layer 14a and etched into a waveguide pattern. An upper clad layer 18 is formed on the core layer 16, as shown in FIG. 1D.

Figure 1F:
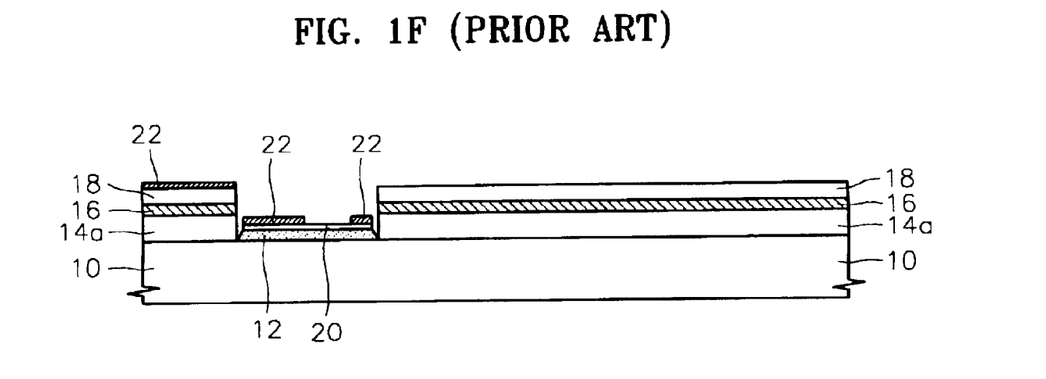

Subsequently, the upper clad layer 18, the core layer 16, and the planarized lower clad layer 14a are dry etched to expose the terrace 12. Accordingly, referring to FIG. 1E, a portion through which the terrace 12 is exposed becomes a trench 19 in which an optical device will be mounted. A dielectric layer 20 is formed on the floor of the terrace 12, and under bump metal (UBM) layers 22 for forming electrodes and a solder pad are deposited on the dielectric layer 20 and on a portion of the upper clad layer 18, as shown in FIG. 1F.

Figure 1G:
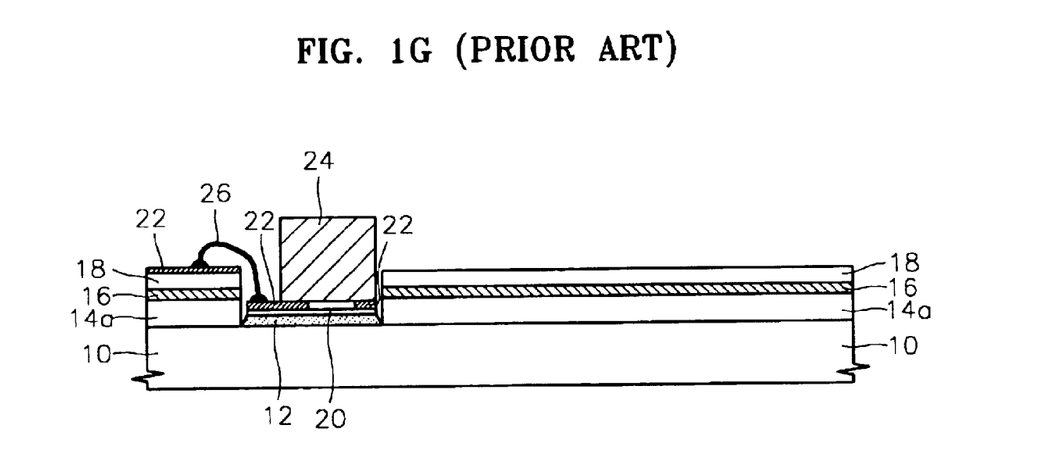

Thereafter, solder is deposited on a solder pad formed of the UBM layers 22 to mount an optical device 24, which is formed of a semiconductor chip, such as an LD or a PD. Then, a metal wire 26 connects the UBM layer 22 for forming an electrode, as shown in FIG. 1G.

The conventional method for manufacturing an optical waveguide platform shown in FIGS. 1A through 1G requires a silicon precision process for forming the terrace 12 and a polishing process for polishing a silica layer composed of the lower clad layer 14 due to the step of the terrace 12.

In this case, the silicon precision process for forming the terrace 12 has various restraints, such as requiring a photo-lithography process that uses a separate mask and being impossible to process a precise pattern when a crystal direction is wrong.

In addition, since the silica layer forming the lower clad layer 14 has a thickness of tens of $\mu m$, the lower clad layer 14 is difficult to be precisely polished. Moreover, when there is non-uniformity in polishing thickness, part of the resulting optical waveguide may be unusable.

In particular, in the case of a general silica optical waveguide device, a difference in the thermal expansion coefficients of a silica layer and the silicon substrate 10 causes the silicon substrate 10 to warpage. Therefore, it is impossible to precisely polish a lower clad layer 14 without variation in the polishing thickness. As a result, the conventional method requires an additional process, such as thermal treatment for eliminating warpage of the silicon substrate 10.

Figure 2A:
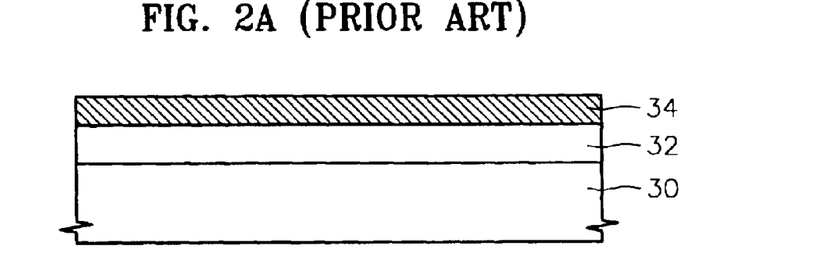
FIGS. 2A through 2G are sectional views illustrating a second conventional method of manufacturing an optical waveguide platform.
Figure 2B:
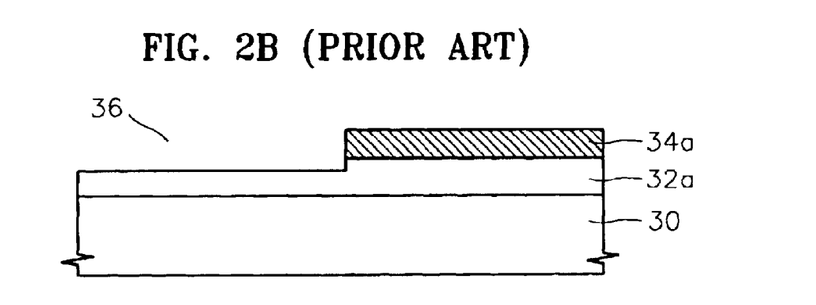

FIGS. 2A through 2G are sectional views illustrating a second conventional method of manufacturing an optical waveguide platform. A lower clad layer 32 and a core layer 34 are sequentially staked on a silicon substrate 30, as shown in FIG. 2A. Portions of the core layer 34 and the lower clad layer 32 are selectively dry etched to a predetermined depth to form a trench 36 in which an optical device will be mounted. In this case, the etch depth has to be finely adjusted to enable vertical alignment between the optical output of the optical device and the core layer 34. Consequently, a fine waveguide pattern formed of a core layer pattern 34a and a lower clad layer pattern 32a having widths of several $\mu m$ is exposed for a considerable height, as shown in FIG. 2B.

Figure 2C:
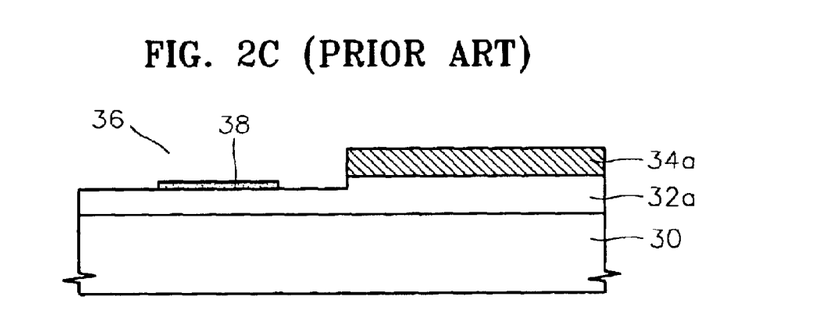
Figure 2D:
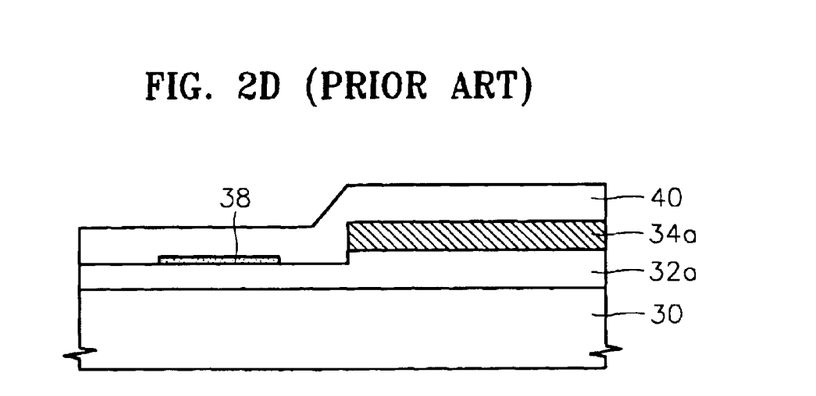

Thereafter, an etch stopper pattern 38 is formed on the lower clad layer pattern 32a in the trench 36, as shown in FIG. 2C. Then, an upper clad layer 40 is deposited on the entire surface of the substrate 30 having the etch stopper pattern 38 and the core layer pattern 34a, as shown in FIG. 2D.

Figure 2E:
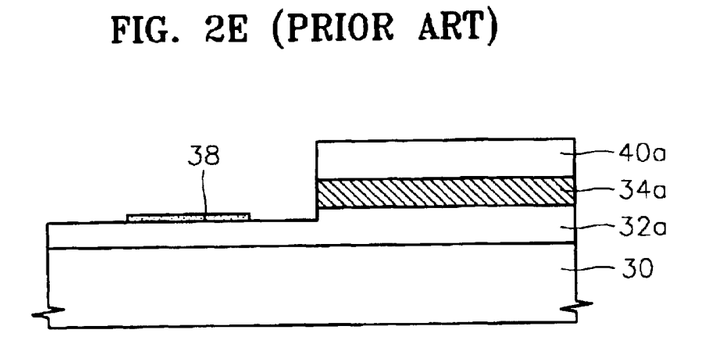
Figure 2F:
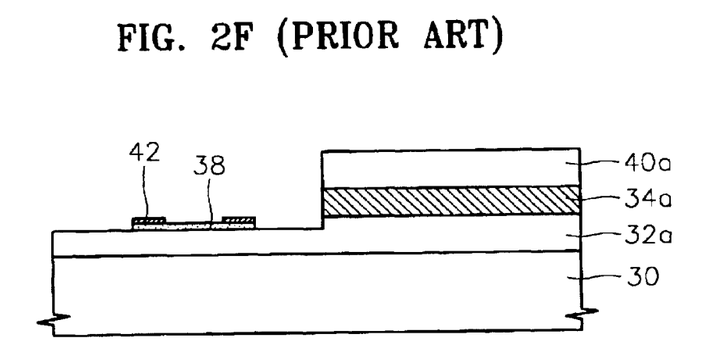
Figure 2G:
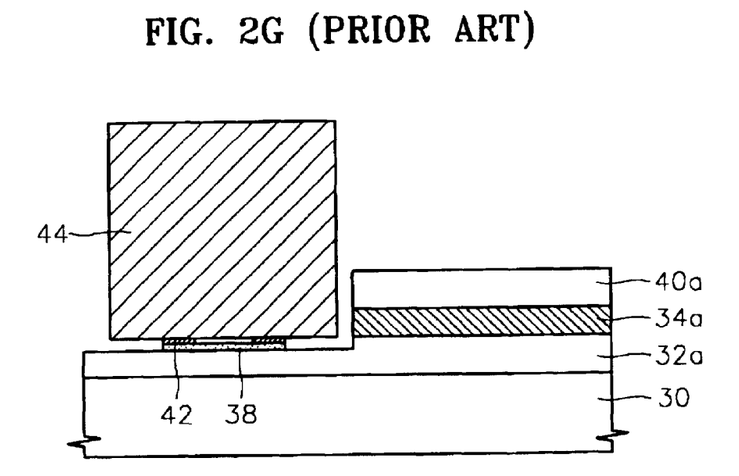

By selectively etching the upper clad layer 40 in the trench 36 region, an upper clad layer pattern 40a, which exposes the etch stopper pattern 38, is formed as shown in FIG. 2E. A metal layer 42 for supplying power for driving the optical device is formed on the etch stopper pattern 38 in the trench 36 as shown in FIG. 2F. Subsequently, solder is deposited on the metal layer 42 to mount an optical device 44 formed of a semiconductor chip, such as an LD or a PD, by a flip chip bonding method, as shown in FIG. 2G.

As described with reference to FIGS. 2A through 2G, the second conventional method of manufacturing an optical waveguide platform forms the etch stopper pattern 38 after the core layer pattern 34a is formed. In this case, the fine optical waveguide pattern having a width of several $\mu m$ may be damaged by a mechanical impact, such as contact with a mask, in a lithography process for forming the etch stopper pattern 38. In addition, in the case of forming the etch stopper pattern 38 by the lithography method, the heights of the upper surface of the core layer pattern 34a which the mask contacts and the etch floor on which the etch stopper pattern 38 is formed become different. Accordingly, defocus occurs in a contact aligner, thereby resulting in the formation of an imprecise etch stopper pattern. In particular, an align key for aligning and mounting the optical device cannot be precisely formed so that it is difficult to precisely align and mount the optical device.

Moreover, in order to perform the second conventional method of manufacturing the optical waveguide platform as shown in FIGS. 2A through 2G, the etch depths of the core layer 34 and the lower clad layer 32 have to be precisely adjusted to vertically align the optical device and the waveguide. In addition, in etching the upper clad layer 40, the etch depth has to be precisely adjusted until the etch stopper pattern 38 is exposed.

SUMMARY OF THE INVENTION

To solve the above-described problems, it is an objective of the present invention to provide an optical waveguide platform that is manufactured by a simple process without requiring etching a silicon substrate or polishing a silica layer.

It is another objective of the present invention to provide a method of manufacturing an optical waveguide platform without damaging an optical waveguide by forming a terrace while etching a trench without anisotropically etching a silicon substrate.

To accomplish the objectives of the present invention, an optical waveguide platform comprises a substrate, a lower clad layer formed on the substrate to have a terrace at a predetermined portion for mounting an optical device, an etch stopper pattern formed on the terrace, a height adjustment layer formed on the lower clad layer without the terrace and the etch stopper pattern to perform precise vertical alignment between the optical device and an optical waveguide by controlling the thickness of the height adjustment layer, an optical waveguide core layer and an upper clad layer sequentially formed on the height adjustment layer, and a metal layer formed on the floor of the terrace, on which the optical device is mounted.

Here, it is preferable that the etch stopper pattern is formed of a material that is not etched in etching silica. The etch stopper pattern may be formed of a chrome oxide layer. It is preferable that the height adjustment layer is formed of a silica layer or a glass layer that has a refractive index similar to that of the lower clad layer. The metal layer may be formed by sequentially forming Ti/Pt/Au or Ti/Ni/Au metal.

To accomplish another objective of the present invention, in a method of manufacturing an optical waveguide platform, a lower clad layer is formed on a substrate and an etch stopper pattern is formed on the lower clad layer. A height adjustment layer is formed on the etch stopper pattern and the lower clad layer and a core layer is formed on the height adjustment layer and patterned to form an optical waveguide pattern. Thereafter, an upper clad layer is formed on the entire surface of the substrate having the optical waveguide pattern. The upper clad layer, the core layer, the height adjustment layer, and the lower clad layer are selectively etched to expose the etch stopper pattern and form a terrace on which an optical device will be mounted. A metal layer and a solder pattern are formed on the floor of the terrace, on which the optical device is mounted.

Here, the etch stopper pattern can be formed of a chrome oxide layer, which is formed by patterning and oxidizing a chrome layer. An align key for aligning the optical device can be formed with the etch stopper pattern. The height adjustment layer can be formed of a silica layer or a glass layer by performing a plasma enhanced chemical vapor deposition (PECVD) method, a low pressure chemical vapor deposition (LPCVD) method, or a sol-gel method. In addition, the height adjustment layer can be formed by a flame hydrolysis deposition (FHD) method and formed with the core layer by controlling the amount of sources for adjusting a refractive index.

The optical waveguide platform according to the present invention can mount the optical device without processing the silicon substrate and prevents defocus in a photolithography process caused by a step, so as to prevent damage to a fine waveguide pattern. In addition, with the optical waveguide platform of the present invention, the characteristics of the optical waveguide device can be examined before etching the trench.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

The present invention will now be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete and will fully convey the concept of the invention to those skilled in the art. In the drawings, the thickness of layers and regions are exaggerated for clarity. It will also be understood that when a layer is referred to as being "on" another layer or substrate, it can be directly on the other layer or substrate, or intervening layers may also be present.

An optical waveguide platform according to an embodiment of the present invention will now be described with reference to FIG. 3G.

An optical waveguide platform according to the present invention is formed of a substrate 100, for example, a silicon substrate, and a lower clad layer 102 is formed thereon. A terrace 114 is formed on a predetermined portion of the lower clad layer 102 to mount an optical device 118. An etch stopper pattern 104 is formed on the terrace 114. In this case, the etch stopper pattern 104 is formed of a chrome oxide layer.

A height adjustment layer 106 is formed on the portions of the lower clad layer 102 where the terrace 114 and the etch stopper pattern 104 are not formed, to perform precise vertical alignment between the optical device 118 and an optical waveguide by controlling the thickness of the height adjustment layer 106.

A core layer 108, i.e., an optical waveguide core pattern, and an upper clad layer 110 are sequentially formed on the height adjustment layer 106. The optical waveguide is formed of the lower clad layer 102, the core layer 108, and the upper clad layer 110. A metal layer 116 on which the optical device 118 is mounted is formed on the floor of the terrace 114. A metal wire 120 is formed to connect the optical device 118 to an electrode.

FIGS. 3A through 3G are sectional views illustrating a method of manufacturing an optical waveguide platform according to an embodiment of the present invention.

Figure 3A:
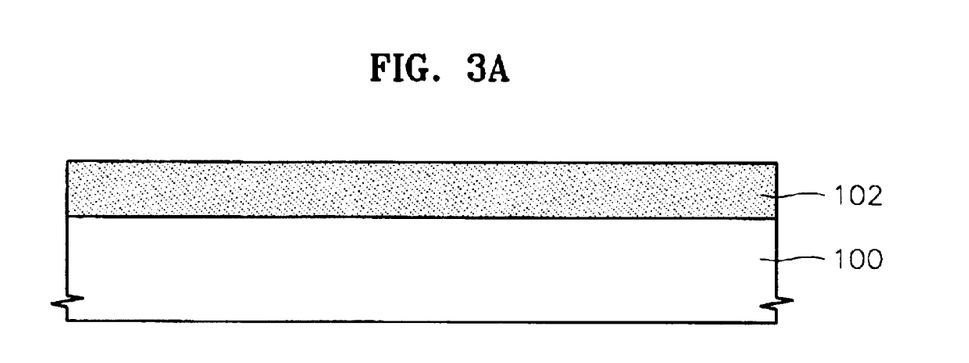
FIGS. 3A through 3G are sectional views illustrating an optical waveguide platform and a manufacturing method thereof according to an embodiment of the present invention.

Referring to FIG. 3A, a lower clad layer 102 is stacked on a substrate 100. The substrate 100 is a silicon substrate, and the lower clad layer 102 is formed of a silica layer by a flame hydrolysis deposition (FHD) method or a plasma enhanced chemical vapor deposition (PECVD) method.

Figure 3B:
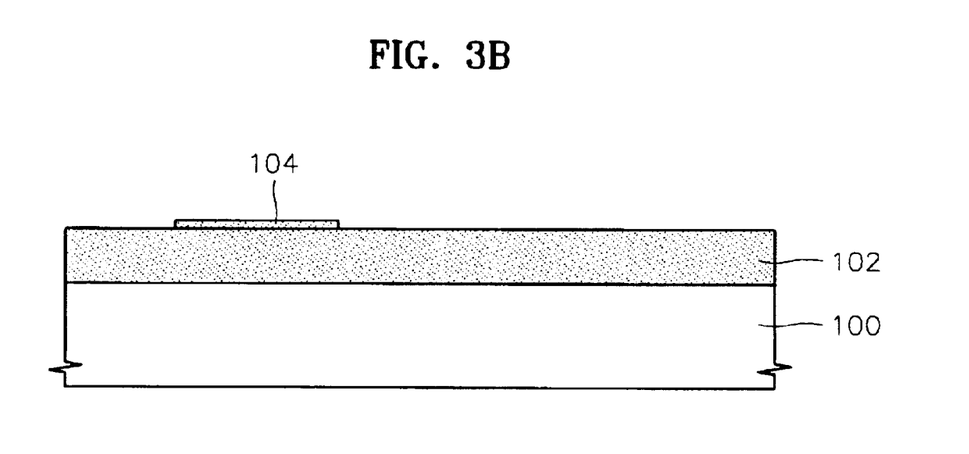

Referring to FIG. 3B, an etch stopper is stacked on the lower clad layer 102 and patterned to form an etch stopper pattern 104. The etch stopper pattern 104 is formed of a material that is not etched in dry etching the silica and that makes it possible to form layers by the FHD method, the PECVD method, and a sputtering method. Preferably, a chrome (Cr) layer with a thickness of about 2000 Å is formed by the sputtering method, patterned by photolithography and wet etching processes, and oxidized in an electric furnace at a temperature of 1000° C. and under an air atmosphere for one hour, so as to become a chrome oxide layer $Cr_2O_3$. In patterning the etch stopper, an align key for aligning an optical device may be simultaneously formed.

Figure 3C:
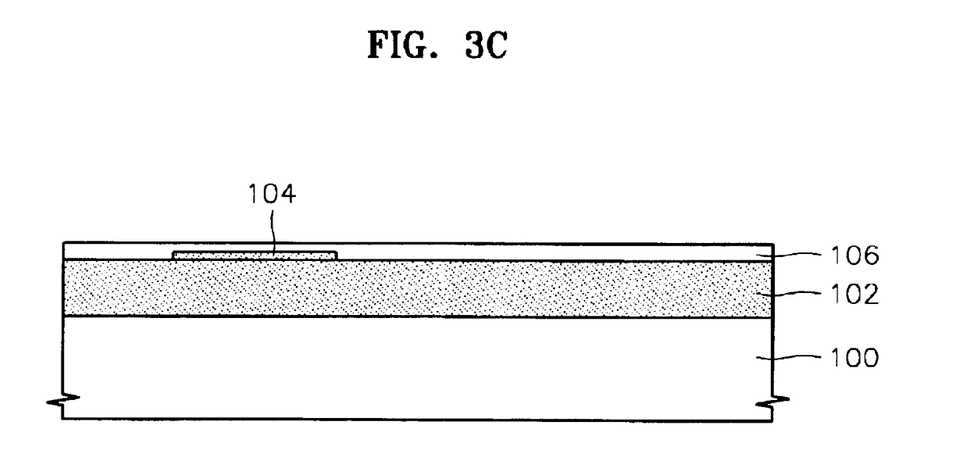

Referring to FIG. 3C, a height adjustment layer 106 is stacked on the entire surface of the substrate 100 having the lower clad layer 102 and the etch stopper pattern 104. The thickness of the height adjustment layer 106 is controlled to precisely align the output of the optical device and the center of a core layer 108 (refer to FIG. 3D) in a vertical direction. Since the etching depth of the height adjustment layer 106 in a following process does not affect the vertical alignment of the optical device and an optical waveguide, it is not required to precisely control the etching depth of the height adjustment layer 106. The height adjustment layer 106 is formed of a transparent layer having a refractive index similar to that of the lower clad layer 102, for example, a silica layer or a glass layer. In addition, the height adjustment layer 106 is formed by the FHD method, the PECVD method, a low pressure chemical vapor deposition (LPCVD) method, or a sol-gel method. More specifically, the height adjustment layer 106 can be formed by the FHD method and formed with the core layer by controlling the input amount of a raw material for adjusting the refractive index.

Figure 3D:
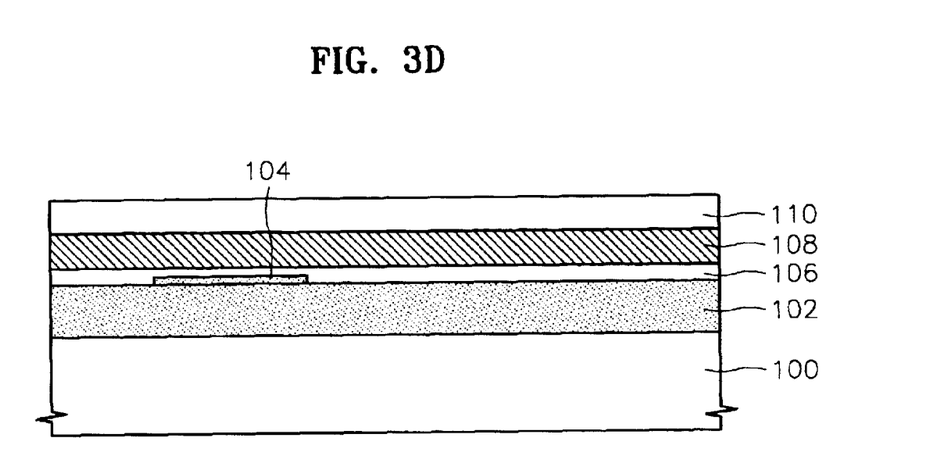

Referring to FIG. 3D, a core layer 108 is stacked on the height adjustment layer 106 and patterned to form an optical waveguide core pattern. FIG. 3D as a vertical view does not illustrate the substantial pattern shape of the optical waveguide pattern. Hereafter, the reference numeral 108 denotes the optical waveguide core pattern.

Sequentially, an upper clad layer 110 is stacked on the entire surface of the substrate 100 having the optical waveguide core pattern 108. The lower clad layer 102, the optical waveguide core pattern 108, and the upper clad layer 110, which form an optical waveguide, may be formed of silica layers with controlled refractive indexes.

The characteristics of the optical waveguide device can be measured in the present step, which has been impossible in the prior art. In other words, in the prior art, since a waveguide is not formed on an etch stopper pattern or a terrace, the optical characteristics of an optical device cannot be measured. However, the waveguide is formed on the etch stopper pattern 104 according to the present invention, so that the characteristics of the optical waveguide device are measured to examine the quality of the waveguide device before etching a trench.

Figure 3E:
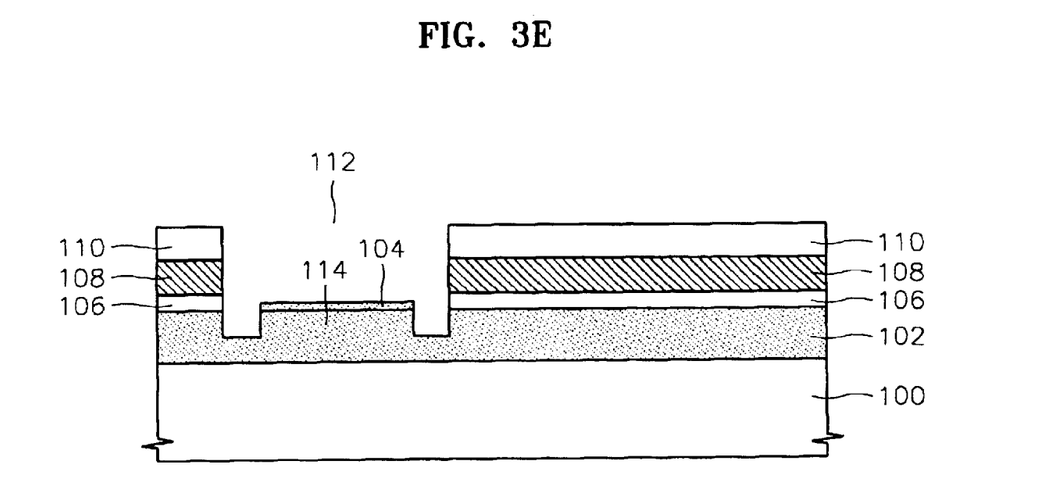

Referring to FIG. 3E, the upper clad layer 110, the optical waveguide core pattern 108, the height adjustment layer 106, and the lower clad layer 102 are selectively etched to form a trench 112 for limiting the location of mounting the optical device. The optical waveguide core pattern 108, which serves as the waveguide, is exposed on the sidewall of the trench 112 of the optical waveguide device to be aligned and connected with the optical axis of the optical device.

The trench 112 is formed by selectively etching the upper clad layer 110, the optical waveguide core pattern 108, the height adjustment layer 106, and the lower clad layer 102 by a photolithography process. Here, the photolithography process may be performed by a reactive ion etching (RIE) method or an inductively coupled plasma etching method by using a metal mask pattern. In this case, the dry etching process is continued after exposing the etch stopper pattern 104 to etch the lower clad layer 102 to a predetermined depth. Moreover, the surface roughness of the sidewall of the optical waveguide device, which is exposed by the dry etching process, is set to be less than $1/10$ of the wavelength of light to be transmitted through the optical waveguide, to form an optical mirror surface. The etch stopper pattern 104 stops the etching while the portion of the lower clad layer 102 without the etch stopper pattern 104 is etched more to form the terrace 114.

Figure 3F:
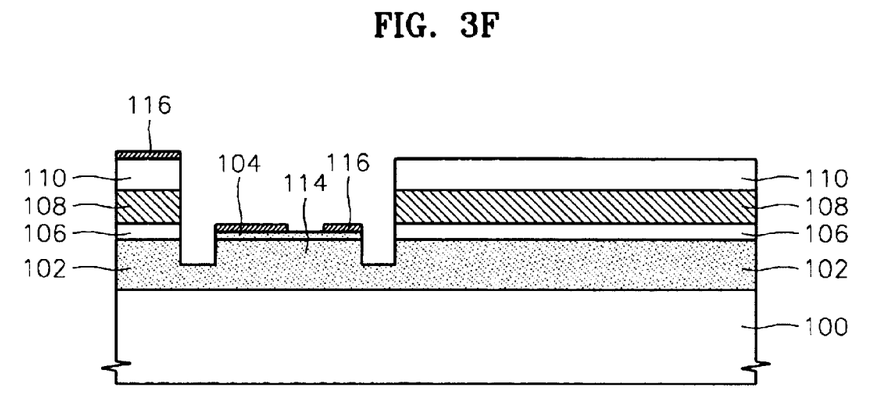

Referring to FIG. 3F, under bump metal (UBM) layers 116 for forming an electrode and a solder pad are formed on the floor of the terrace 114 and a portion of the upper clad layer 110. The UBM layers 116 are formed of a high quality conductor and are firmly attached to the floor of the terrace 114 to provide driving current to an optical device. The UBM layers 116 can be formed by sequentially performing a thermal evaporation method or an electron beam evaporation method using Ti/Pt/Au or Ti/Ni/Au and patterned by a lift-off method.

Figure 3G:
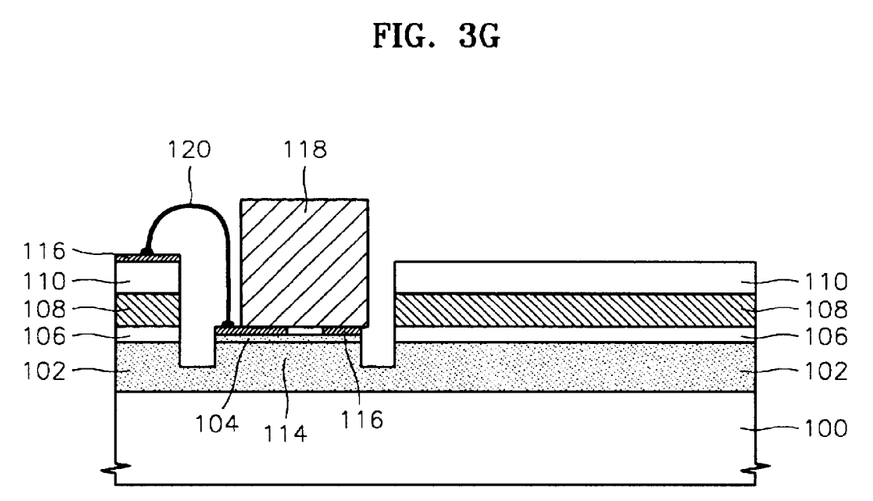

Referring to FIG. 3G, solder formed of an alloy, such as InPb, PbSn, or AuSn, is deposited on the metal layers 116 and molten at a temperature of less than 400° C. to mount an optical device 118, which is formed of a semiconductor chip, such as an LD or a PD, by a flip chip bonding method. Then, a metal wire 120 connects the optical device 118 to an electrode.

As described above, an optical waveguide platform according to the present invention forms the terrace for mounting the optical device in etching the trench by using the etch stopper pattern formed on the lower clad layer. Accordingly, the optical waveguide platform according to the present invention may mount the optical device without anisotropically etching the silicon substrate. Therefore, a problem of anisotropic etching limiting the direction for using the silicon substrate can be solved.

Since the optical waveguide platform according to the present invention forms the terrace in etching the trench after forming the optical waveguide device, no polishing process of a lower clad layer of the optical waveguide device is required. In addition, since in the optical waveguide platform according to the present invention, the etch stopper pattern is formed before etching the core layer, damage to the fine patterns of the optical waveguide, which is generated in forming an etch stopper after etching an optical waveguide in a conventional method, is prevented. Furthermore, deterioration of pattern precision due to defocus in performing photolithography according to the etching height in the conventional optical waveguide is prevented.

In manufacturing the optical waveguide platform according to the present invention, the optical waveguide is formed on the etch stopper pattern; therefore, the quality of the waveguide device can be examined. As a result, the optical waveguide platform according to the present invention can be manufactured by a simple method at a low cost and without damage to the waveguide.

What is claimed is:

1. An optical waveguide platform, comprising:
    a substrate;
    a lower clad layer formed on the substrate to have a terrace at a predetermined portion for mounting an optical device;
    an etch stopper pattern formed on the terrace;
    a height adjustment layer formed on the lower clad layer without the terrace and the etch stopper pattern to perform precise vertical alignment between the optical device and an optical waveguide by controlling the thickness of the height adjustment layer;
    an optical waveguide core layer and an upper clad layer sequentially formed on the height adjustment layer; and
    a metal layer formed on the floor of the terrace, on which the optical device is mounted.

2. The optical waveguide platform of claim 1, wherein the etch stopper pattern is formed of a material that is not etched in etching silica.

3. The optical waveguide platform of claim 2, wherein the etch stopper pattern is formed of a chrome oxide layer.

4. The optical waveguide platform of claim 1, wherein the height adjustment layer is formed of a silica layer or a glass layer that has a refractive index similar to that of the lower clad layer.

5. A method of manufacturing an optical waveguide platform comprising the acts of:
    forming a lower clad layer on a substrate;
    forming an etch stopper pattern on the lower clad layer;
    forming a height adjustment layer on the etch stopper pattern and the lower clad layer;
    forming and patterning a core layer on the height adjustment layer to form an optical waveguide core pattern;
    forming an upper clad layer on the entire surface of the substrate having the optical waveguide core pattern;
    selectively etching the upper clad layer, the optical waveguide core pattern, the height adjustment layer, and the lower clad layer to expose the etch stopper pattern and form a terrace on which an optical device will be mounted; and
    forming a metal layer on the floor of the terrace,
    wherein the optical device is mounted on the metal layer.

6. The method of manufacturing an optical waveguide platform of claim 5, wherein the etch stopper pattern is formed of a chrome oxide layer, which is formed by patterning and oxidizing a chrome layer.

7. The method of manufacturing an optical waveguide platform of claim 5, wherein an align key for aligning the optical device is formed with the etch stopper pattern.

8. The method of manufacturing an optical waveguide platform of claim 5, wherein the height adjustment layer is formed of a silica layer or a glass layer by performing a plasma enhanced chemical vapor deposition (PECVD) method, a low pressure chemical vapor deposition (LPCVD) method, or a sol-gel method.

9. The method of manufacturing an optical waveguide platform of claim 5, wherein the height adjustment layer is formed with the core layer by a flame hydrolysis deposition (FHD) method.

* * * * *